United States Patent
Ron et al.

(10) Patent No.: US 12,415,975 B2
(45) Date of Patent: Sep. 16, 2025

(54) BIOGAS AND RESIDUE PROCESSING FROM THIN STILLAGE

(71) Applicant: DTA LLC, Tamarac, FL (US)

(72) Inventors: Manuel Maximiliano Ron, Río Cuarto (AR); Juan Matías Córdoba, Río Cuarto (AR); Manuel Otero Seyfarth, Río Cuarto (AR)

(73) Assignee: DTA, LLC, Tamarac, FL (US)

(*) Notice: Subject to any disclaimer, the term of this patent is extended or adjusted under 35 U.S.C. 154(b) by 839 days.

(21) Appl. No.: 17/711,470

(22) Filed: Apr. 1, 2022

(65) Prior Publication Data

US 2023/0313090 A1  Oct. 5, 2023

(51) Int. Cl.
C12F 3/10 (2006.01)
B01D 3/00 (2006.01)
C05F 5/00 (2006.01)

(52) U.S. Cl.
CPC ............... *C12F 3/10* (2013.01); *B01D 3/002* (2013.01); *C05F 5/008* (2013.01); *B01D 2257/30* (2013.01); *B01D 2257/80* (2013.01)

(58) Field of Classification Search
CPC .................................. C12F 3/10; C05F 5/008
See application file for complete search history.

(56) References Cited

U.S. PATENT DOCUMENTS

| | | | |
|---|---|---|---|
| 5,250,182 A * | 10/1993 | Bento | C12F 3/10 210/651 |
| 8,017,365 B1 | 9/2011 | Rein et al. | |
| 8,153,006 B1 | 4/2012 | Fessler et al. | |
| 8,637,304 B1 | 1/2014 | Burke | |
| 8,669,083 B2 | 3/2014 | Veit et al. | |
| 8,962,309 B2 | 2/2015 | Friedmann | |
| 2006/0006116 A1* | 1/2006 | Scheimann | C02F 1/56 210/728 |
| 2007/0141691 A1 | 6/2007 | Hirl | |
| 2007/0249029 A1 | 10/2007 | Marshall et al. | |
| 2011/0059498 A1 | 3/2011 | Sanders et al. | |
| 2014/0065685 A1 | 3/2014 | Rosenberger et al. | |
| 2016/0060587 A1* | 3/2016 | Hebert | C12P 7/06 435/162 |
| 2017/0114293 A1* | 4/2017 | Jakel | B01D 3/002 |
| 2019/0211291 A1* | 7/2019 | Svetlichny | A23K 10/38 |

FOREIGN PATENT DOCUMENTS

WO  2010100224 A1  9/2010

OTHER PUBLICATIONS

"Biogas Production from Thin Stillage: Exploring the microbial response to sulphate and ammonia", Acta Universitatis agriculturae Sueciae, 2015:10, Jan Moestedt 2015.

* cited by examiner

*Primary Examiner* — Jonathan M Hurst
(74) *Attorney, Agent, or Firm* — McAfee & Taft (57) ABSTRACT

Processes, systems and equipment are for treating a digestate resulting from the thin stillage of a bioethanol plant. They can include a decarbonizer system to reduce the carbon and water footprint in an ethanol plant and associated biogas plant by treating a digestate stream resulting from a thin stillage digester. The treatment includes heating the digestate stream to decompose ammonia bicarbonate contained in the digestate stream into ammonium and bicarbonate; and contacting the heated digestate stream with air so that a first portion of the ammonia is desorbed from the heated stream to mix with the air.

23 Claims, 5 Drawing Sheets

BIOGAS AND RESIDUE PROCESSING FROM THIN STILLAGE

FIELD

This disclosure relates to systems and methods for treating thin stillage from a bioethanol plant. More particularly, the disclosure is relevant to converting thin stillage into biogas and to a treatment system for the digestate resulting from the thin stillage.

BACKGROUND

Ethanol is produced sustainably by yeast fermentation of sugars from biomass feedstock-mainly grains (corn, wheat, barley, rye, triticale) or sugar (cane, beet). After fermentation, the ethanol is recovered by distillation. The leftover is known as stillage or whole stillage. Each liter of ethanol produced can produce up to 20 L of stillage.

Whole stillage is usually centrifuged to produce a liquid fraction (thin stillage) and a solids fraction (wet distillers' grains (WDG)). The thin stillage has typically been concentrated in evaporators and mixed with dried WDG (DDG) to form distiller's dried grains with soluble (DDGS), which is used as feed for livestock.

Alternatively, the thin stillage has been fed to a digester. In the digester, the thin stillage undergoes an anaerobic digestion process. For example, acetogen and/or methanogen bacteria can be used in the anaerobic digestion to generate a methane containing biogas. The digestates (solids and/or liquids containing solids) are separated from the biogas. The biogas is then used for energy. The digestates may be used in agriculture as fertilizer. Also, digestates, or portions thereof, may replace water used in the production of ethanol; unfortunately, these digestates contain unclaimed substances and compounds that generate many issues.

For example, low-solids digestates can have high levels of ammonium bicarbonate (($NH_4H)CO_3$). Thus, when introduced to the bioethanol production process, this ammonium bicarbonate containing water contributes to creating a high ammonium concentration in the bio-reactor, which has a harmful and/or inhibiting effect on reactions to generate ethanol. Additionally, the presence of ammonium bicarbonate necessitates the additional need to use sulfuric acid to adjust the pH of the low-solids digestate to be used as the process water. This increases the sulfur load of the system, which has a harmful and/or inhibiting effect on reactions to generate ethanol, increase the levels of sulfur in ethanol, overload the sulfur limits by law in the WDG, and increases the sulfur levels in thin stillage, which requires further treatment of products, such as the biogas, to remove compounds like $H_2S$.

Accordingly, it would be advantageous to develop systems and processes that enhance bioethanol and biogas production by better utilization of the digestates, reducing use of acids, and/or limiting ammonium load in the bioethanol reaction.

SUMMARY OF THE INVENTION

As described in more detail hereunder, the processes, systems and equipment of this disclosure are for treating a digestate resulting from the thin stillage of a bioethanol plant. Specifically, some embodiments relate to a decarbonizer system to reduce the carbon and water footprint of an ethanol plant and associated biogas plant, which produces biogas, in an efficient energy-conservative way from a portion of thin stillage resulting from the ethanol plant.

For example, embodiments of this disclosure include a process for treating a digestate stream resulting from a thin stillage digester, the process comprising the steps of:

(a) heating the digestate stream so as to form a heated stream, wherein the heating is to a temperature of at least about 194° F. (90° C.) to decompose ammonia bicarbonate contained in the digestate stream into ammonium and bicarbonate;

(b) contacting the heated stream with air, wherein a first portion of the ammonia is desorbed from the heated stream to mix with the air so as to form a gaseous effluent stream and leave a treated digestate stream; and (c) introducing the treated digestate stream to the bioethanol plant so as to form part of a grain slurry used for production of ethanol.

In the process, the contacting of the heated stream with air can be by counter-current contact. During the contacting of the heated stream with air, a portion of the bicarbonate reacts with metals in the digestate to form carbonates which settle out from the heated stream during the counter-current contact.

For example, the step of contacting the heated stream with air can further comprise:

(i) introducing the heated stream into a desorption zone to form a desorbed stream, wherein within the desorption zone the heated stream undergoes counter-current contact with air, so as to desorb the first portion of the ammonia from the heated stream so as to mix with air to form an air mixture, and wherein a first portion of the bicarbonate reacts with metals in the digestate to form carbonates which settle out from the heated reduced-solids stream during the counter-current contact, the air mixture is separated from the desorbed digestate and removed from the desorption zone; and (ii) introducing the desorbed digestate stream from the desorption zone to a retention zone so that the digestate stream is maintained at temperature of at least about 194° F. (90° C.) so as to eliminate bacteria, wherein in the retention zone a second portion of the ammonia is separated from the desorbed digestate, and a second portion of the bicarbonate reacts with the metals to form carbonates which settle out from the desorbed digestate so as to form the treated digestate stream, and wherein the second portion of the ammonia is removed from the desorption zone and combined with the first portion of the air mixture to form the gaseous effluent stream.

In the above embodiments, the metals generally included one or more of magnesium, potassium, zinc, manganese, calcium, iron, copper, and/or sodium. Also, after the contacting of the digestate with air, the treated digestate has a pH from 8 to 9.5. Optionally, acid can be added to the treated digestate having a pH from 8 to 9.5 so as to adjust the pH for introduction to the bioethanol plant.

In the above processes, the heating of the digestate stream can be heated to a temperature from 194° F. (90° C.) to 212° F. (100° C.) to form the heated stream. Also, prior to the heating of the digestate stream, a portion of the solids, including insoluble salts, can be separated out from the digestate stream so as to reduce the solids in the digestate stream to the range of from 1.1 to 1.5 wt. % solids, and wherein the digestate stream as a pH of from 7 to 8.

In the above embodiments, the digestate stream can be produced from thin stillage produced in a bioethanol plant by the steps of:

(i) introducing the thin stillage to a digesting zone at a temperature in a mesophilic temperature range, wherein within the digesting zone the thin stillage undergoes anaerobic digestion to produce methane and carbon dioxide;
(ii) separating a digestate stream from a gaseous stream containing the methane and the carbon dioxide; and
(iii) introducing the gaseous stream to a desulfurization zone where desulfurization is carried out to remove hydrogen sulfide, wherein the desulfurization produces an acid-water stream having a pH from 1.5 to 3, a biogas stream, and waste stream containing at least one of ammonium sulfide, ammonium hydrosulfide or ammonium bicarbonate; and wherein the conditions during producing the digestate stream are suitable to promote the formation of ammonium bicarbonate.

In such embodiments, the acid-water stream from the desulfurization zone can be contacted with the gaseous effluent stream from processing the digestate so as to remove ammonia from the gaseous effluent stream and form a water stream containing ammonia, ammonium sulfide and ammonium hydrosulfide and having a pH from 8 to 9.7. The water stream can be introduced into the desulfurization zone.

Further, the temperature of the thin stillage prior to introduction into the digesting zone can be adjusted to a temperature in the mesophilic temperature range. For example, the temperature in the mesophilic temperature range can be from 68° F. (20° C.) and 113° F. (45° C.).

Additionally, embodiments of this disclosure include systems for carrying out the above process embodiments.

BRIEF DESCRIPTION OF THE DRAWINGS

FIG. 2 utilizes more details in order to illustrate different aspects from FIGS. 1A and 1B.

FIG. 4 is a graph of pH vs gallons of sulfuric acid 98% per 1000 gal of digestate in order to illustrate buffer in the untreated digestate and reduction of the buffer in the treated digestate.

DESCRIPTION

The present disclosure may be understood more readily by reference to the following description including the examples. In addition, numerous specific details are set forth in order to provide a thorough understanding of the embodiments described herein. However, those of ordinary skill in the art will understand that the embodiments described herein can be practiced without these specific details. In other instances, methods, procedures and components have not been described in detail so as not to obscure the related relevant feature being described. Additionally, the description is not to be considered as limiting the scope of the embodiments described herein.

In the drawings like reference numbers are used herein to designate like elements throughout the various views, various embodiments are illustrated and described. The figures are not necessarily drawn to scale, and in some instances the drawings have been exaggerated and/or simplified in places for illustrative purposes only. Where components of relatively well-known designs are employed, their structure and operation will not be described in detail. One of ordinary skill in the art will appreciate the many possible applications and variations of the present invention based on the following description.

As used herein, "ammonia" will refer to ammonia ($NH_3$) and/or ammonium ($NH_4^+$), which is obtained by the protonation of ammonia. When ammonia is dissolved in water, a tiny amount of it converts to ammonium ions:

$$H_2O + NH_3 \rightleftharpoons OH^- + NH_4^+$$

The degree to which ammonia forms the ammonium ion depends on the pH of the solution. If the pH is low, the equilibrium shifts to the right: more ammonia molecules are converted into ammonium ions. If the pH is high, the equilibrium shifts to the left: the hydroxide ion abstracts a proton from the ammonium ion, generating ammonia. Accordingly, in this disclosure both will be referred to as "ammonia" unless the context indicates that only ammonia or ammonium is being referred to.

As used herein, both "bioethanol plant" and "ethanol plant" refer to is a plant or operation in which ethanol is produced sustainably by fermentation of sugars from a biomass feedstock—mainly grains (corn, wheat, barely, rye, triticale) or sugar (cane, beet). In a typical bioethanol plant, the grain is milled and chemically and enzymatically pretreated, and the resulting carbohydrate monomers are fermented to ethanol by yeast.

As used herein "whole stillage" or "stillage" refers to the residue from a bioethanol plant after the ethanol is recovered by distillation. The whole stillage is typically separated into thin stillage and wet distillers' grains (WDGs). "Thin stillage" is the residual liquid material—typically containing 12% or less solids (typically, 5-12% solids)—following fermentation, ethanol distillation, and centrifugation of whole stillage. WDG is the solid residue after centrifugation.

"Mesophilic bacteria" means bacteria that grow and thrive in a moderate temperature range, referred to as mesophilic temperature range.

"Mesophilic temperature range" refers to the moderate temperature range that supports growth of mesophilic bacteria and is 68° F. (20° C.) and 113° F. (45° C.). The optimum temperature range for these bacteria in anaerobic digestion is typically 85° F. (30° C.) to 100° F. (38° C.).

"Thermophilic temperature range" is above 45° C. and extends to the upper limit of life.

"Thermophilic bacteria" refers to any bacteria that grows and thrives in the Thermophilic temperature range.

"Sorption" as used herein describes the actions of absorption and adsorption. The major difference between adsorption and absorption is that one is a surface process and the other a bulk process. "Adsorption" refers to one substance being deposited on the surface of another substance. "Absorption" refers to one substance entering the bulk, or volume, of another substance e.g. a gas absorbed by a liquid.

"Desorption" as used herein is the opposite of sorption.

As described in more detail hereunder, the process, system and equipment of this disclosure are for treating a digestate resulting from the thin stillage of a bioethanol plant. In some embodiments, the system and process are for converting thin stillage into biogas and a digestate, and for replacing at least of a portion of the water used in the bioethanol plant with some of the resulting digestate. Embodiments that cover thin stillage to biogas and a treated digestate can be characterized as a decarbonizer system to reduce the carbon and water footprint in an ethanol plant through a biogas plant that produces biogas in an efficient energy-conservative way from a portion of thin stillage resulting from the ethanol plant and produces a treated digestate that can be recycled to be used in the bioethanol plant with a minimal use of sulfuric acid.

The select embodiments of the process, systems and equipment described herein target the production of biogas from thin stillage, one of the waste streams of an ethanol plant. Additionally, the select embodiments aim to treat the digestate (the biggest waste stream of a biogas plant) into a flow without buffer capability; in other words, with reduced or no ammonium bicarbonate (buffer). The buffer is responsible for the large use of acid needed to regulate the pH of the stream recycled from digestate to the liquefaction step of the ethanol plant. Additionally, the processes and systems aim to reduce the biological activity of the digestate, to avoid the large use of antibiotics for the fermentation step.

Figure 1:
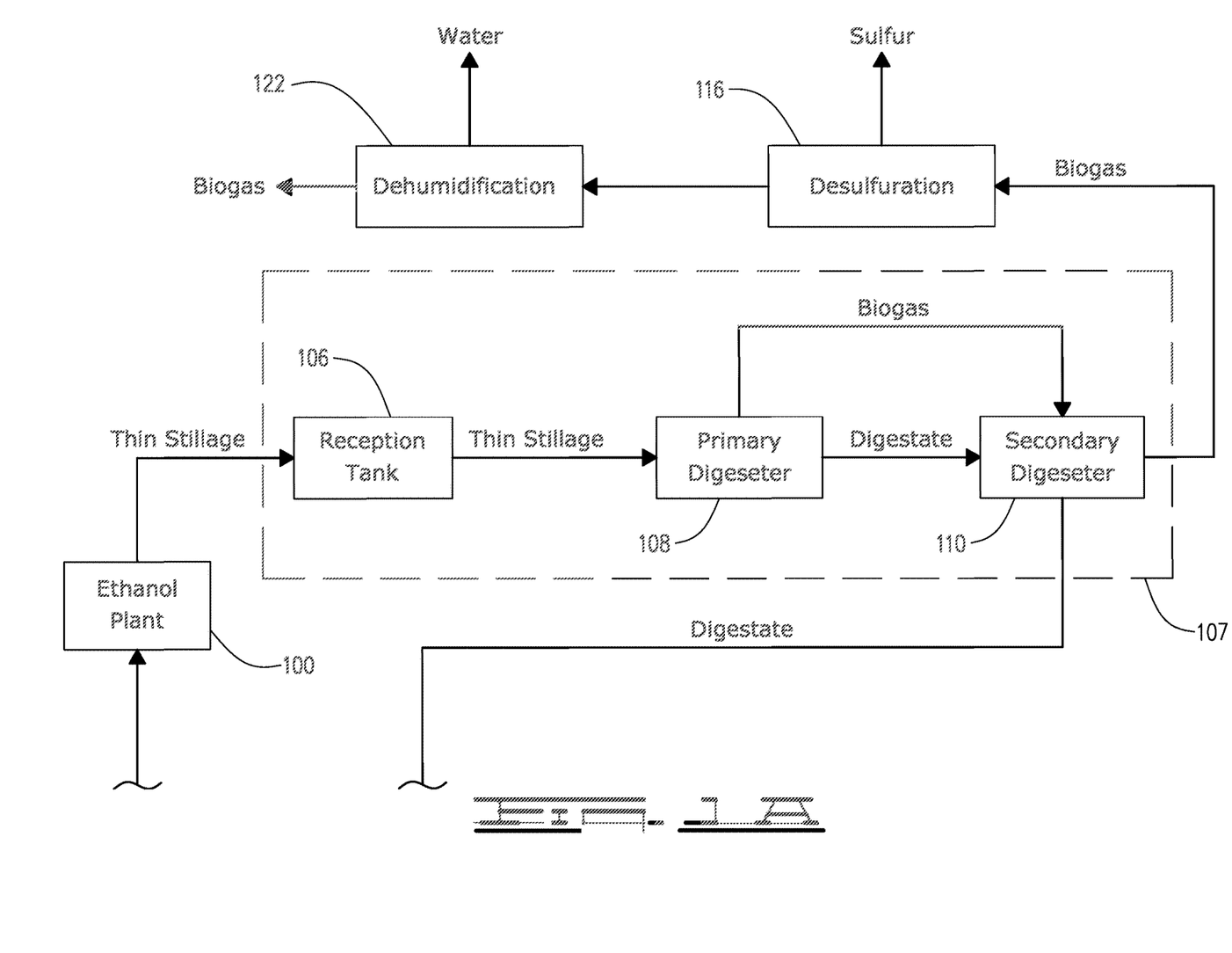
FIGS. 1A and 1B are a schematic representation a system for treating thin stillage in accordance with a first embodiment of the current disclosure.
Figure 1B:
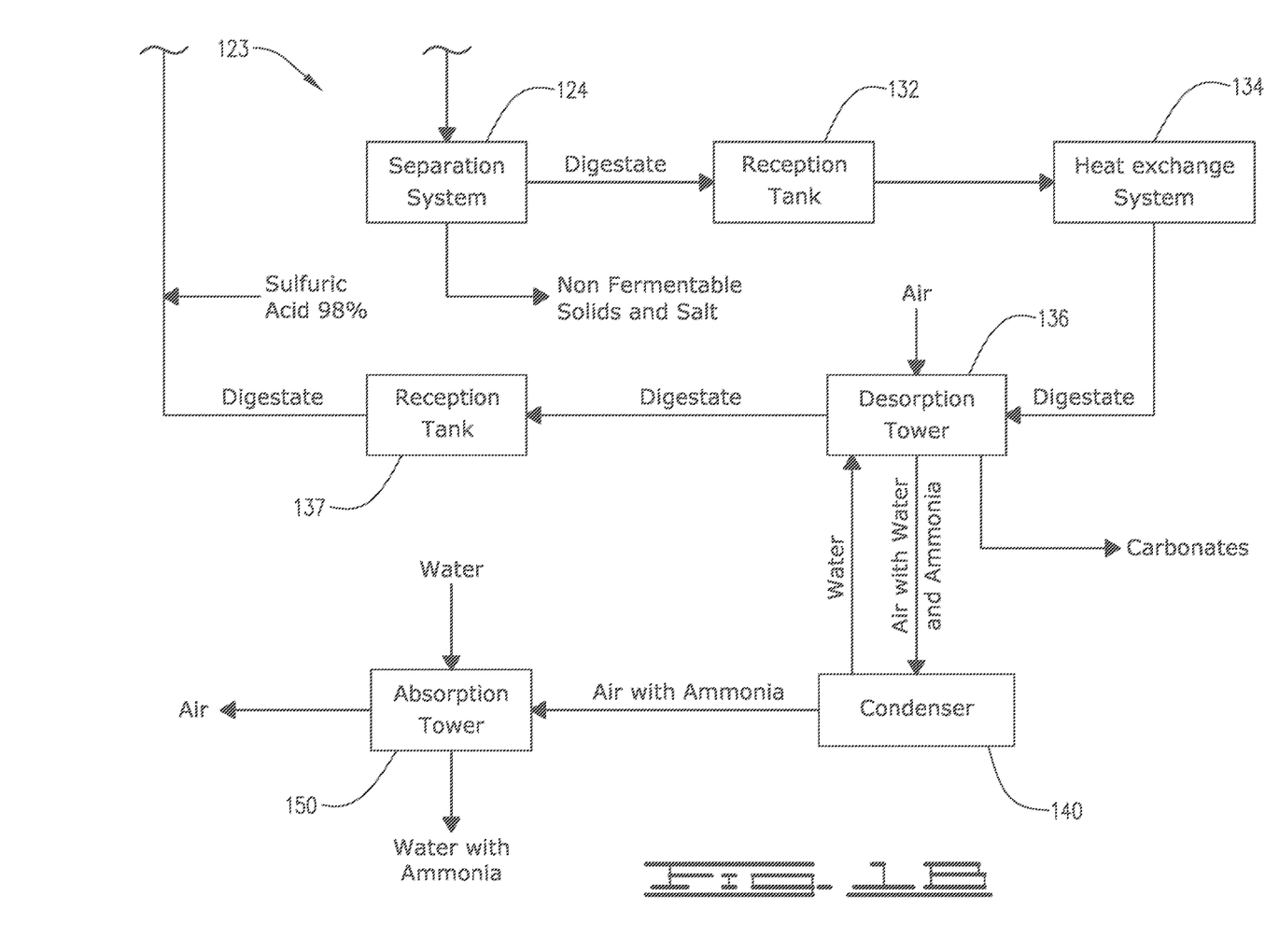

Turning now to FIGS. 1A and 1B, a simplified process and system flow diagram of a biogas and digestate treatment system is shown. FIGS. 1A and 1B illustrate some of the main components of the system, and further details will be discussed in relation to FIG. 2.

The process starts with the ethanol plant 100 where ethanol and diverse sub-products are produced, including thin stillage. The thin stillage has been separated out of the whole stillage (not shown). The thin stillage is comprised of water and a percentage of non-fermentable solids, normally has a solids content of 12 wt. % or less, and typically the solids content will be at least about 5 wt %, or at least 7 wt %. For example, whole stillage from an ethanol fermentation process is typically first processed to remove undissolved solids and produce the thin stillage. The thin stillage generally is processed in a thin-stillage evaporation system so as to remove water and condense the thin stillage to a syrup having about 30 wt. % to about 35 wt. % solids, which is a waste product that can be used as cattle feed. For the thin stillage processing below, thin stillage can be taken off before the evaporation system, as needed, and processed to produce biogas and a digestate stream that can be recycled back to the ethanol plant.

This thin stillage is introduced into reception tank 106, which is used as a reservoir of thin stillage. Within reception tank 106, a stabilized temperature in the mesophilic temperature range is maintained. Additionally, the thin stillage within tank 106 typically undergoes constant agitation to produce a uniform mixture of thin stillage that buffers the variations of the input, allowing the composition of the thin stillage effluent to be almost invariant.

Next the thin stillage effluent is introduced into a digester zone 107, which typically comprises one or more digesters and includes reception tank 106. As illustrated, thin stillage effluent first enters digester 108. Within first digester 108, thin stillage is inoculated with acetogen bacteria and/or methanogen bacteria. Inside the tank the solids of the thin stillage are degraded through different metabolic routes under anaerobic conditions (absence of oxygen). The bacteria degrade the solids in the thin stillage to produce methane and carbon dioxide.

Typically, at least one other digester is utilized, such as second digester 110. Second digester 110 increases the residence time of thin stillage in order to degrade as much organic matter as possible to further reduce the percentage of solids, increase methane production and make the system more efficient. At the same time, it works for the containment and accumulation of the gas produced.

Generally, the parameters of reception tank 106 and digesters 108 and 110 are continuously controlled to keep these parameters in optimal range. For example, these components may include one or more heat exchangers (not shown) to keep the temperature in the mesophilic temperature range, and/or include a system (not shown) to feed micronutrients to promote digestion, to feed antifoaming agents, and/or to feed other compounds to keep low the level of hydrogen sulfide in the gas.

For example, the process can start with a heat exchange system where the temperature of the thin stillage is set at from about 86° F. to about 100° F. (about 30° C. to about 38° C. to be received in a conditioning tank. The conditioned thin stillage is dosed with bacteria in the first digester and digestion occurs in the first digester 106 at a temperature from about 95° F. to about 102° F. (about 35° C. to about 39° C.) for 23-35 days residence time. Subsequently, additional digestion can occur at a similar temperature in the second digester 108.

After the digestion, two streams are removed from the digestion zone: a biogas stream and a digestate stream. Generally, the biogas stream goes through desulfurization unit 116, where the hydrogen sulfide is removed, and a dehumidification unit 122 to reduce the percentage of water.

A digestate treatment system or interface system 123 for the digestate return flow begins with a separation system or zone 124 that separates non-fermentable solids and an insoluble salt from the liquid phase. The non-fermentable solids and insoluble salts can be sent to a reception tank (not shown) until disposed of, such as by using as a fertilizer. From separation system 124, the digestate, now lower in solids, is sent to digestate reception tank 132, which is used as a reservoir tank. While the system of FIGS. 1A and 1B shows the separation system 124 before the reception tank 132 so as to feed reduced-solids digestate to the reception tank, it is also within the scope of this disclosure for the separation system 124 to be after the reception tank 132.

The digestate from separation system 124 is now reduced in these solids, and typically comprises 1.8 wt. % solids or less, for example about 1.1 wt. % to about 1.5 wt % of solids. This low-solids digestate goes through a heat exchange system 134 where its temperature is elevated, which can be at least partially by heat exchange flow with another hot flow from the ethanol plant. This stage aims at reducing the use of steam in the last heat exchanger where the operation temperature of the desorption tower 136 is reached. Generally, this operational temperature will 194° F. (90° C.) or greater, such as from about 194° F. to about 212° F. (about 90° C. to about 100° C.), for example 203° F. (95° C.).

The operational temperature results in substantially all the ammonium bicarbonate ($(NH_4)HCO_3$) decomposing into ammonium ($NH_4^+$) and bicarbonate ($HCO_3^-$). Accordingly, after reaching the operational temperature, ammonium bicarbonate can be removed as ammonia, and as carbonates within the desorption tower 136.

After desorption, treated digestate is accumulated in reception tank 137, which can act as a pasteurizer tank in which the microbiological activity of bacteria is eliminated by maturation time at the elevated temperature of the stream coming from the desorption tower. After tank 137, acid is added to regulate the pH as required for use in ethanol plant 100.

Ammonia removed in desorption tower 136 is removed in a gaseous stream, which can also comprise air and steam. This gaseous stream is introduced into condenser 140 that lowers the temperature of the gaseous stream to condense the steam into water, which is return to absorption tower 150.

After the condenser, the gaseous stream can be further cooled to a temperature from about 68° F. to about 122° F. (about 20° C. to about 50° C.). Then the gaseous stream is introduced into absorption tower 150. In absorption tower 150, the gaseous stream is contacted with a flow of water, typically an acid water, to remove the ammonia. This contact results in two effluents from absorption tower 150. The first effluent is clean air, which is sufficiently clean for safe release into the environment. The second effluent is a flow of water containing the ammonia, which may be in the form of ammonium, ammonium sulfate, or ammonium bisulfate, or mixtures thereof, depending on the conditions of the absorption process. The second effluent can be used as nitrogen fertilizer or as solvent of carbon dioxide (forming ammonium bicarbonate) and hydrogen sulfide. For example, the second effluent can be used in the desulfurization of the biogas to remove both hydrogen sulfide and carbon dioxide, thus reducing contamination by the hydrogen sulfide and capturing carbon dioxide to reduce the carbon footprint of the plant and increase the quality of the biogas.

Figure 2:
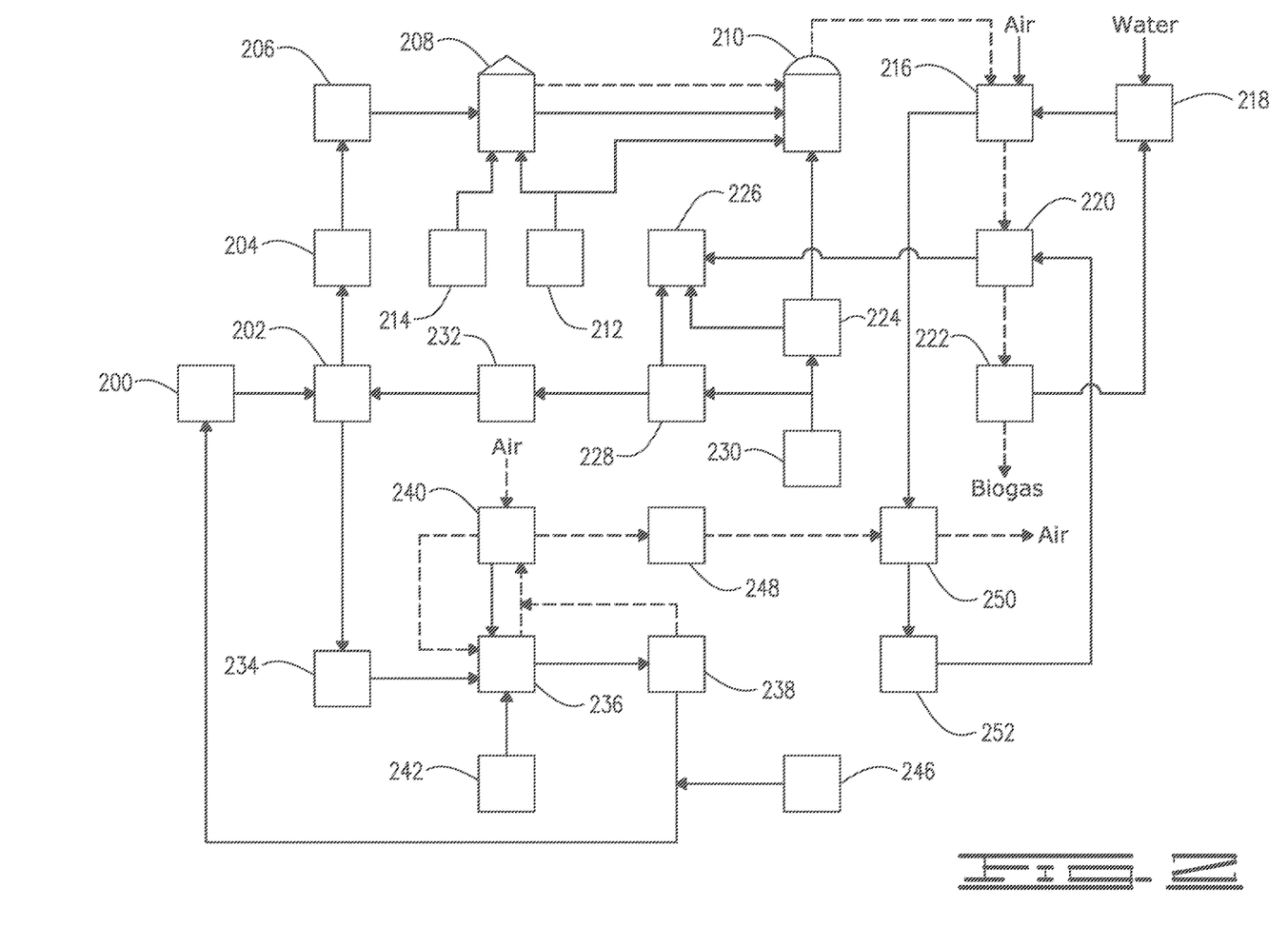
FIG. 2 is a schematic illustration of a system for treating thin stillage in accordance with a second embodiment of the current disclosure.

Turning now to FIG. 2, the embodiments of this disclosure will be discussed in more detail by focusing on embodiments having further features and advantages that can be achieved under this disclosure.

As in the embodiment of FIGS. 1A and 1B, the process of FIG. 2 starts with receiving a thin stillage from the ethanol plant 200. The thin stillage can be separated from a whole stillage produce by ethanol plant 200.

The thin stillage is introduced into one or more heat exchangers to adjust its temperature to a conditioning temperature; typically, a temperature in the mesophilic temperature range, such as from about 86° F. to about 100° F. (about 30° C. to about 38° C.). As illustrated, the system uses a first heat exchanger 202 and a second heat exchanger 204. First heat exchanger 202 is generally an indirect heat exchanger using counter current contact to cool one fluid while heating another system fluid. In the illustrated embodiment, the thin stillage is cooled by counter current contact with a digestate stream from reception tank 232, which is being preheated. Afterwards, the cooled thin stillage stream is introduced into second heat exchanger 204 to further lower the temperature to the conditioning temperature.

After the cooling, the thin stillage is introduced into reception tank 206 at the conditioning temperature to be conditioned and ensure the availability of raw material to the process. Reception tank 206 is operated so as to provide a long (typically, 3 to 15 days) retention time with constant agitation. The long retention time of reception tank 206 buffers changes in the incoming flow of thin stillage and agitation keeps a homogenous substrate.

From the reception tank 206, conditioned thin stillage is fed to a first digester 208 and then to second digester 210. Generally, reception tank 206, first digester 208, and second digester 210 are maintained at a temperature in the mesophilic temperature range; although they are not necessarily all at the same temperature. For example, reception tank 206 can be at of from 86° F. (30° C.) to 93° F. (34° C.), and the digesters can be in the range of from 97° F. (36° C.) to 102° F. (39° C.). The operation of the retention tank 206, first digester 208, and second digester 210 in the mesophilic range is advantageous in that less heat is lost from the vessels and the pipelines than in a thermophilic operation. Additionally, this results in less energy use through smaller heat exchangers needed, and less energy to keep the digester at the operational temperature.

Thin stillage has an elevated level of nitrogen, and this produces high levels of ammonia in the digesters. However, the inventors have realized that when digestion is carried out at mesophilic temperatures the generation of ammonia is not problematic and can be advantageous. At mesophilic temperatures the ammonia reacts with carbon dioxide ($CO_2$, also generated during digestion) to form ammonium bicarbonate (($NH_4$)$HCO_3$). The ammonia bicarbonate acts to keep the pH of the digester at a suitable level to promote digestion by bacteria, because the ammonium ($NH_4^+$ is bound into the salt of ammonium bicarbonate (($NH_4$)$HCO_3$) instead of being present as a cation, which can poison the methanogenic bacteria. However, at higher temperatures, such as thermophilic temperatures, the equilibrium shifts so as to be in favor of decomposition of ammonium bicarbonate into ammonia and bicarbonate ($HCO_3^-$). This decomposition means that at a thermophilic temperature the higher levels of ammonium and bicarbonate act to poison methanogenic bacteria and reducing the production of methane ($CH_4$), greatly impacting the efficiency of the digester. In this regard, it is noted that ammonium is more alkaline than bicarbonate; thus, among other things, the system within the digester tends to get more alkaline with time.

At the same time, the forming of foam is less at lower temperatures. Foam inhibits the liberation of methane and can go through the gas pipelines, producing many issues. To avoid the formation of foam in the digesters an anti-foaming agent can be administered, such as from an anti-foaming agent tank 212 to first digester 208 and second digester 210. Advantageously, less anti-foaming agent will be needed in the current process and system due to the lower form formation over prior systems using higher temperatures.

Micronutrients are consumed during the fermentation in ethanol plant 200; accordingly, micronutrients can be replenished by administration to first digester 208 from nutrient system tank 214. For example, micronutrients such as Cobalt, Copper, Iron, Manganese, Molybdenum, Zinc, Nickel, Selenium, Boron, Magnesium, Potassium, Calcium, Sulfates, Phosphates, and many others can be added to the digestion.

As indicated above, after the digestion in first digester 208, the digestate is introduced into second digester 210. The digestate coming from first digester 208 will typically have a solids content of about 1.5 wt % to about 2.5 wt %. Second digester 210 operates under the same conditions as first digester 208, but generally at half of the volume and half of the retention time. For example, the retention time within first digester 208 can be from about 23 to about 35 days. Correspondingly, the retention time within second digester 210 can be about 11.5 days to about 17.5 days.

Further, second digester 210 can use membranes to help separate the produced biogas from the liquid and solid components. Such membranes maintain the separation of the gas and liquid/solid components so that second digester can be store biogas until it is conditioned/treated. As can be seen from FIG. 2, biogas produced in first digester 208 can be introduced into second digester 210 prior to being taken off for further treatment.

Generally, the biogas generated in the digesters will be further conditioned prior to being used in further applications. At a minimum, such conditioning typically involves removing the hydrogen sulfide ($H_2S$) and most of the water vapor contained in the biogas. Biogas produced in digesters comprises methane, carbon dioxide and hydrogen sulfide; also, water vapor is generally present. Typical biogas produced in digesters will have from 300 ppm to 20,000 ppm hydrogen sulfide. Use of the processes and systems of this disclosure can advantageously reduce the hydrogen sulfide content of the biogas from the digesters to be below 400 ppm, generally below 300 ppm, and more typically 200 ppm or below. Generally, the hydrogen sulfide will be at least 100 ppm but in some cases the process can achieve hydrogen sulfide contents of less than 100 ppm. Additionally, the biogas produced in digesters can be from about 37% v/v to about 40% v/v carbon dioxide.

The biogas from the second digester is introduced to a first desulfurization unit 216. In the illustrated embodiment, first desulfurization unit 216 is a biological desulfurization system. Desulfurization bacteria use oxygen and water at to convert hydrogen sulfide ($H_2S$) into sulfur (S) and sulfuric acid ($H_2SO_4$). The desulfurization unit 216 requires water provided from water tank 218, and requires oxygen ($O_2$) that is provided by injecting air. The waste output of the tower is acid water typically having a pH from about 1.5 to about 3. The acid water is introduced into absorption tower 250.

Biogas from the first desulfurization unit 216 can be introduced into a second desulfurization unit 220 where additional hydrogen sulfide and carbon dioxide are removed in a chemical reaction with ammonia. Generally, the desulfurization equipment works as an absorption tower. Within second desulfurization unit 220, hydrogen sulfide in water and acts as a weak acid, giving hydrosulfide ion ($HS^-$) that react with ammonia and forms ammonium hydrosulfide ($NH_3HS$) and ammonium sulfide (($NH_3)_2S$), which can be sent to reception tank 226. At the same time, ammonia reacts with bicarbonate anion ($HCO_3^-$) the soluble form of carbon dioxide ($CO_2$) to give ammonium bicarbonate (($NH_4$)$HCO_3$), which also can be sent to reception tank 226. Thus, amounts of hydrogen sulfide and carbon dioxide in the biogas is further reduced. For example, the biogas exiting the second desulfurization unit can have from 0 ppm to 150 ppm hydrogen sulfide, and from 0% v/v to 9% v/v carbon dioxide.

Biogas from second desulfurization unit 220 is introduced to dehumidification unit 222 where the humidity of biogas is reduced by 40% to 60%. Condense water from dehumidification unit 220 can be introduced into water tank 218. Biogas from dehumidification unit 222 can be used or further processed; thus, the biogas can be used in a CHP (Combined Heat and Power) system, or can go to the boiler of the ethanol plant where natural gas is replaced so as to reduce the carbon footprint of the ethanol plant, or further processed in another treatment system where any remaining carbon dioxide (CO2) is removed, and the methane is compressed to be sold as liquid gas.

Returning now to second digester 210, all the digestate produced goes through a treatment system to be conditioned in order to replace at least a portion of the fresh water in the liquefaction step in ethanol plant 200. The digestate from second digester 210 now has about 1.3 to 2 wt % solid and a pH of from 7 to 8, for example a pH of 7.8. This digestate is introduced to a first separator, such as hydro-cyclone 224, to take out part of the solids; specifically, insoluble salts such as trimagnesium phosphate ($Mg_3(PO_4)_2$), which is sent to reception tank 226. Such insoluble salts can be problematic if not removed. For example, they can plug heat exchangers and pipelines, and can increase the frequency cleaning the system components.

Next, the digestate can be introduced in to a second separator 228. Second separator 228 can be any equipment able to reduce the solids of the digestate, and while second separator 228 is optional, it can be beneficial. For example, second separator 228 can be a decanting centrifuge operated with a thickening agent, such as cationic polyacrylamide. The thickening agent can be added before the decanting centrifuge from tank 230. Removing solids of the digestate improves the efficiency of the ethanol plant, because most of the solids are non-fermentable solids resulting in wasted energy moving solids which are useless in most of the steps of the ethanol plant.

Second separator 228 has two effluents. The first effluent comprises the solids and flocculants removed from the digestate. These are introduced into reception tank 226. The contents of reception tank 226 can be stored and sold as bio-fertilizers.

The second effluent is the digestate with a now reduced solids content, typically with a concentration of about 1.1 wt. % to about 1.5 wt % of solids (total percentage of soluble and insoluble solids). The pH of the second effluent is still from 7 to 8, for example 7.8. This reduced-solids digestate continues through the treatment system to reception tank 232 where it can be accumulated to sure availability of digestate for the remaining portions of the process and ethanol plant 200.

Digestate accumulated in reception tank 232 can be sent to first heat exchanger 202 to heat the digestate by indirect counter-current heat exchange with thin stillage from ethanol plant 200. The digestate can then be further heated in another heat exchanger, such as steam heat exchanger 234. Generally, the digestate will be heated to a temperature suitable to promote the decomposition of ammonium bicarbonate, typically from about 194° F. to about 212° F. (about 90° C. to about 100° C.), as further discussed below. This hot digestate is introduced from heat exchanger 234 to desorption zone or desorption tower 236 where the buffer of ammonium bicarbonate is removed and starts the biological treatment.

Figure 3:
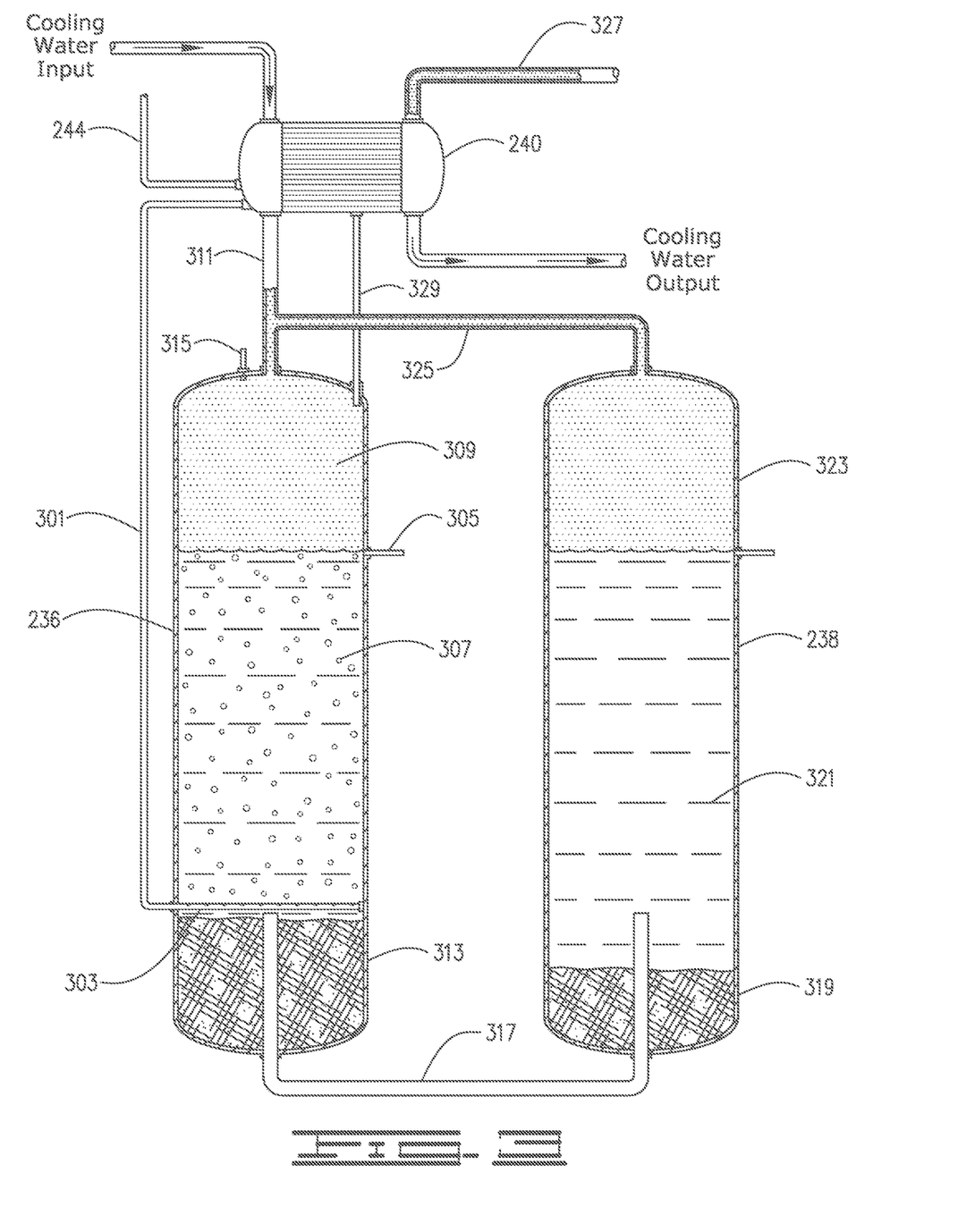
FIG. 3 is schematic illustration of the desorption system utilized in the embodiment of FIG. 2.
Figure 5:
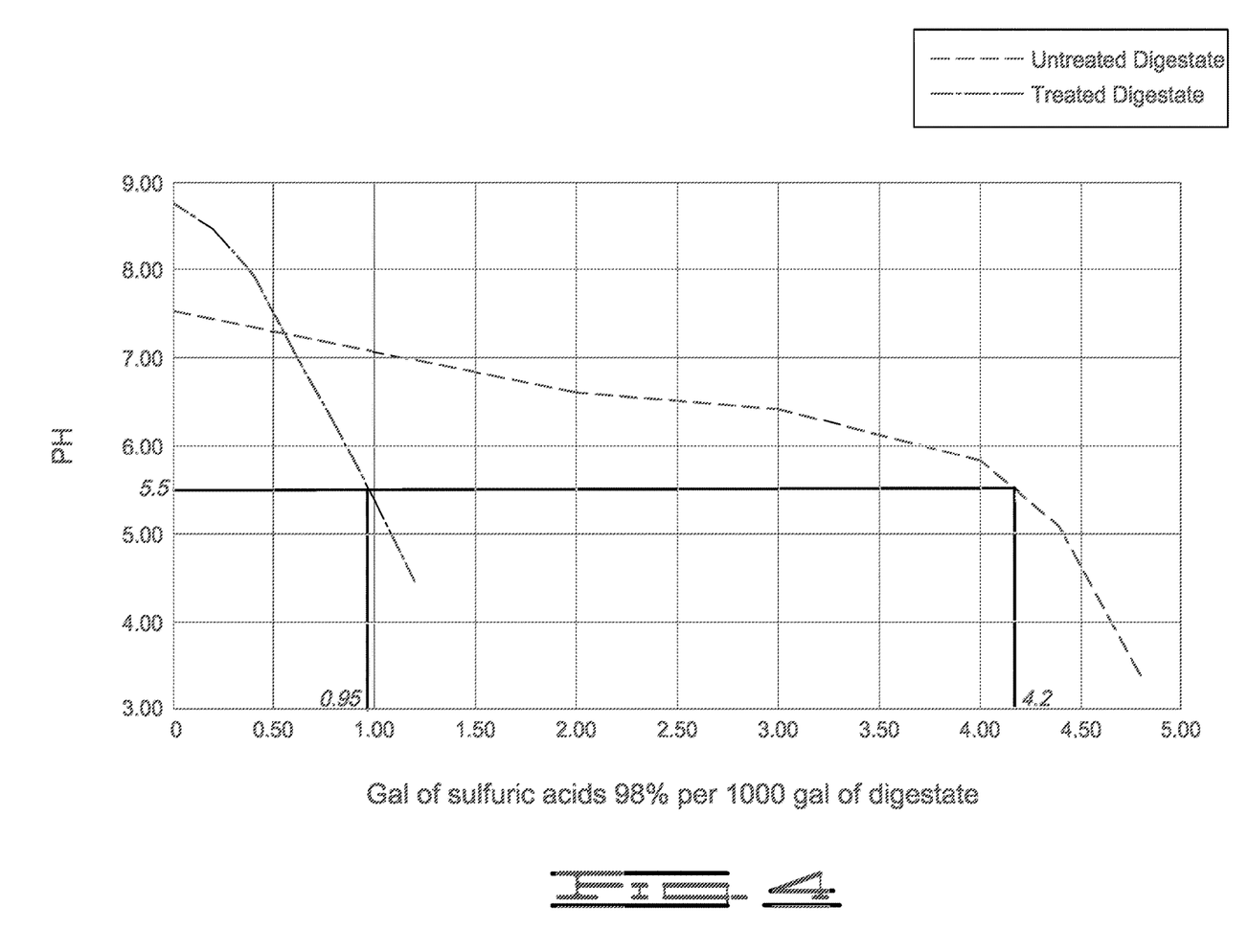

The desorption system, including desorption tower 236, pasteurizer tank 238 and condenser 240, can be seen in more detail in FIG. 3.

The desorption tower 236 is used to extract buffer (ammonium bicarbonate) from the digestate. The digestate should be at a temperature suitable to from decompose ammonium bicarbonate into ammonia and bicarbonate within desorption tower 236. To effectively and efficiently do so, typically requires a temperature of from about 194° F. to about 212° F. (about 90° C. to about 100° C.).

An air flow is introduced through air pipe 301 and is spread evenly with air spreader 303, while heated digestate is introduced into desorption tower 236 through conduit 305. The flow of digestate and a flow of air needs to be in a countercurrent way in order to extract the entire buffer; thus, conduit 305 is spaced apart from air spreader 303 and introduces the digestate higher in the desorption tower. Air that goes through the fluidized bed 307 extracts or desorbs ammonia from the digestate and moves to the top portion 309 of the desorption tower 236. Air with a high concentration of ammonia is taken off the top portion 309 through top conduit 311. Hot digestate and air bubbling produce foam so typically an anti-foaming agent is added through conduit 315 from tank 242.

On the other hand, the bicarbonate from the decomposed ammonium bicarbonate form carbonates within desorption tower 236. At least a portion of these are deposited as salt in the desorption tower and another portion can be dissolved in the digestate.

By way of further explanation, ammonium bicarbonate is a very soluble chemical in water: (0.143 oz/in$^3$ at 77° F., and 0.211 oz/in$^3$ at 104° F. (0.248 g/ml at 25° C., and 0.366 g/ml at 40° C.). Ammonium bicarbonate has a great buffer capacity and the quality of being in constant equilibrium with the species from which it results (carbon dioxide, ammonia, and water). This equilibrium is almost completely displaced towards formation of ammonium bicarbonate at temperatures below 104° F. (40° C.); however, the equilibrium is reversed at temperatures above 140° F. (60° C.) and is almost completely displaced towards formation of carbon dioxide, ammonia and water at temperatures greater than 194° F. (90° C.).

$$NH_4HCO_3 \leftarrow CO_{2(ac)} + H_2O_{(l)} + NH_{3(ac)} <104° \text{ F. [40° C.]}$$

$$NH_4HCO_3 \leftrightarrow CO_{2(ac)} + H_2O_{(l)} + NH_{3(ac)} >140° \text{ F. [60° C.]}$$

$$NH_4HCO_3 \rightarrow CO_{2(ac)} + H_2O_{(l)} + NH_{3(ac)} >194° \text{ F. [90° C.]}$$

If the medium surrounding the compound is liquid (aqueous based), both ammonia and carbon dioxide are re-solubilized in the form of ammonium and carbonic acid. Achieving only the decomposition of the buffer but not the extraction.

$$H_2O_{(l)} + NH_{3(ac)} \rightarrow OH^- + NH_4^+{}_{(ac)}$$

In this way, the air bubbles capture the ammonia from the medium because of a difference in concentration between the liquid and gaseous medium, until the air is saturated with ammonia.

On the other hand, carbonic acid reacts with the X cations (X referring to minerals present in the digestate that can form carbonates) present in the medium to form their corresponding carbonates resulting in the decrease in its conjugate base (ammonium). Many of the carbonates formed are insoluble, and they are deposited in the desorption tower bottom 313 or embedded on the wall of the desorption tower.

$$CO_{2(g)} + H_2O_{(l)} \leftrightarrow H_2CO_{3(ac)}$$

$$H_2CO_3^-{}_{(ac)} + H_2O_{(l)} \leftrightarrow H_3O^+ + H_1CO_3^{-2}{}_{(ac)}$$

$$H_1CO_3^-{}_{(ac)} + H_2O_{(l)} \leftrightarrow H_3O^+ + CO_3^{-2}{}_{(ac)}$$

$$aCO_3^{-2}{}_{(ac)} + bX^{+c} \rightarrow X_b(CO_3)_{a(ac)}$$

Carbonates can only be formed with the minerals present in the digestate. The mineral referred to by X are magnesium, potassium, zinc, manganese, calcium, iron, copper, and sodium. Under normal conditions of temperature and pH (about 77° F. (about 25° C.) and a pH of about 7), carbonates of the alkali metals as potassium and sodium are completely soluble in water; alkaline earth metals (magnesium and calcium) are partially soluble in water, and the rest of the minerals form insoluble carbonates. Here, the conditions inside the desorption tower 236 are temperatures of 194° F. to 212° F. (90° c. to 100° C.) and an alkaline pH (typically around 9 pH), these conditions favor the insolubility of carbonates because the inverse solubility with the temperature of the carbonates and the alkaline conditions that displace the equilibrium to the carbonate salt.

Treated digestate, now having a pH of from about 8 to about 9.5, is taken off near or at bottom portion 313 and goes through conduit 317, which is in fluid flow communication with the bottom portion 319 of pasteurizer tank 238. Pasteurizer tank 238 works as a reservoir of treated digestate for the process and works as a biological treatment step. In the tank most of the bacteria in the medium is eliminated by heat and time, avoiding excess use of antibiotics. Generally, the digestate in tank 238 will have a temperature suitable to kill the bacteria, which typically is at least about 194° F. (90° C.) and can be in the range of from 194° F. (90° C.) to 212° F. (100° C.).

The retention in pasteurizer tank 238 is suitable for the precipitation of any carbonates that may have been dragged through conduit 317 with the treated digestate. These carbonates are deposited in bottom potion 319. Conduit 317 extends upward inside pasteurizer tank 238 sufficiently to avoid the depositing carbonates and plugging but is low enough to ensure the accumulation of carbonates and adequate operation time inside the tank. The flow speed of the digestate through the fluidized bed 321 is suitable for the precipitation of any carbonates that may have been dragged through conduit 317 with the treated digestate.

A minor part of the ammonia gas is produced in the pasteurizer tank 238. This gas accumulates in the top portion 323 and goes through conduit 325 to join with top conduit 311. In order to ensure that any water that condenses out of the gases flow into the desorption tower 236, conduit 325 is inclined downward toward desorption tower 236.

Air with ammonia and water vapor goes through conduit 311 to condenser 240. Condenser 240 reduces the temperature of the air flow by a few degrees to condense water vapor and recuperate water in the air stream. For example, the air flow can be reduced by about 1.8° F. to about 9° F. (about 1° C. to about 5° C.). The recuperated water can be introduced back into desorption tower 236 through conduit 329. Air with ammonia, and less water vapor, flows out through conduit 327, which is in fluid flow communication with heat exchanger 248.

During the condensing of the water in condenser 240, the air temperature should still be relatively high temperature to avoid the dissolution of ammonia into the condensed water. Generally, the temperature can be maintained above 194° F. (94° C.), for example, about 201° F. to about 210° F. (about 94° C. to about 99° C.). The temperature drop in condenser 240 can be by heat exchanged from the air/ammonia/vapor flow from conduit 311 with the inflow of air that is going to be injected in the desorption tower 236. Air goes into condenser 240 through conduit 244 and goes out through conduit 301. Generally, the flow of air used in the desorption tower 236 is not enough to condense sufficiently condense the vapor of water from the air/ammonia/vapor stream from conduit 311; accordingly, cooling water or another cold fluid flow can be used to reach the target temperature drop.

Returning now to FIG. 2, treated digestate from pasteurizer tank 238 will be reduced in ammonium bicarbonate, preferably it is very low in ammonium bicarbonate, typically so as to eliminate 95% to 99% of the ammonium bicarbonate from the digestate stream that entered desorption tower 236. The treated digestate typically has a pH from about 8 to about 9.5 because of the concentration of ammonia still remaining, and remains at the temperature-generally about 201° F. to about 210° F. (about 94° C. to about 99° C.) This treated digestate is ready to return to bioethanol plant 200 for use in place of fresh water. Although generally not needed, acid from acid tank 246 if the pH needs to be adjusted for use in the liquefaction step of the bioethanol plant. Because the treated digestate is relatively buffer free, it advantageously can be used in the bioethanol plant will little or no added acid. Even if acid is need, it is at a much lower quantity than prior art systems. Reduction of the buffer (ammonium bicarbonate) of the current system equates to the reduction of the consumption of acid. Generally, the current system can reduce the use sulfuric acid by 75% or more from prior art systems.

Turning now to FIG. 4, the effect of lowering the ammonium bicarbonate in the digestate can be better understood. FIG. 4 illustrates that a digestate stream coming from the digestate system (untreated digestate) requires significantly more acid to reduce the pH to 5.5 than does a digestate stream which has been treated in the current system including a desorption system as described above (treated digestate). The untreated digestate in FIG. 4 required 4.2 gallons of sulfuric acid to reach the pH of 5.5, and the treated digestate only 0.95 gallons of acid. While ammonium bicarbonate is beneficial in the production of biogas because it helps maintain a pH of about 7.5 to 8, which is necessary in the biogas process, the ammonium bicarbonate in the digestate to be recycled to the ethanol plant is undesirable because the ethanol-production process requires a pH between 6 and 5. To achieve the lower pH, sulfuric acid is added to the digestate stream. As FIG. 4 illustrates, a digestate stream treated in accordance with this disclosure can greatly reduce the amount of sulfuric acid used. In fact, normally the mash of the ethanol plant (at the point where digestate is fed) is already acid, so in many applications with the treated digestate it would be necessary to add any acid.

The flow of air with ammonia leaving condenser 240 goes to heat exchanger 248 to lower the temperature of the gases; generally, the temperature is lowered to be from about 68° F. to about 122° F. (about 20° C. to about 50° C.). The cooled gases are introduced into absorption tower 250. Absorption tower 250 contacts water with the incoming flow of gases. In this case, acid water of the first desulfurization unit 216 is used. Ammonia is dissolved in water, at the same time sulfuric acid ($H_2SO_4$) improves the capturing of ammonia through acid-base reaction, producing ammonium sulfate (($NH_4$)$_2SO_4$) and ammonium bisulfate ($NH_4HSO_4$).

$$H_2O_{(l)} + NH_{3(ac)} \rightarrow OH^- + NH_4^+{}_{(ac)}$$

$$NH_4^+{}_{(ac)} + HSO_4^- \rightarrow NH_4HSO_4$$

$$2NH_4^+{}_{(ac)} + SO_4^{-2} \rightarrow (NH_4)_2SO_4$$

Air without ammonia (or at least with ammonia reduced for safe release to the atmosphere) is taken out to the environment. The water re-circulates in absorption tower 250 until a pH of about 9.8 to about 11 is reached. The equipment takes out water with ammonia to the reception tank 252.

The water with ammonia goes from reception tank 252 so as to be introduced into the to second desulfurization unit 220 where ammonia reacts with hydrogen sulfide to give ammonium hydrosulfide ($NH_4HS$) and ammonium sulfide (($NH_4$)$_2S$).

$$SH_{2(ac)} + H_2O_{(l)} \rightarrow SH^-{}_{(ac)} + H_3O^+$$

$$SH^-{}_{(ac)} + H_2O_{(l)} \rightarrow S^{-2}{}_{(ac)} + H_3O^+$$

$$NH_4^+{}_{(ac)} + SH^-{}_{(ac)} \rightarrow NH_4SH$$

$$2NH_4^+{}_{(ac)} + S^{-2}{}_{(ac)} \rightarrow (NH_4)_2SH$$

At the same time, ammonia reacts with bicarbonate anion ($HCO_3^-$) the soluble form of carbon dioxide to give ammonium bicarbonate. A flow of water rich with ammonium, ammonium hydrosulfide, ammonium sulfide and ammonium bicarbonate goes out from second desulfurization unit 220 to reception tank 226 to be used as bio-fertilizer. Typically, this flow has a pH from about 8 to about 9.7.

While systems and methods are described in terms of "comprising," "containing," or "including" various components or steps, the systems and methods also can "consist essentially of" or "consist of" the various components and steps. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently. "from approximately a-b") disclosed herein is to be understood to set forth every number and range encompassed within the broader range of values. Additionally, where the term "about" is used in relation to a range it generally means plus or minus half the last significant figure of the range value, unless context indicates another definition of "about" applies.

In addition, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent(s) or other documents that may be incorporated herein by reference, the definitions that are consistent with this specification should be adopted.

What is claimed is:

1. A process for treating a digestate stream resulting from a thin stillage digester, the process comprising:
   heating the digestate stream so as to form a heated stream, wherein the heating is to a temperature of at least about 194° F. (90° C.) to decompose ammonia bicarbonate contained in the digestate stream into ammonium and bicarbonate;
   contacting the heated stream with air, wherein a first portion of the ammonia is desorbed from the heated stream to mix with the air so as to form a gaseous effluent stream and leave a treated digestate stream; and
   introducing the treated digestate stream to the bioethanol plant so as to form part of a grain slurry used for production of ethanol.

2. The process of claim 1, wherein the contacting of the heated stream with air is by counter-current contact.

3. The process of claim 1, wherein during contacting of the heated stream with air, a portion of the bicarbonate reacts with metals in the digestate to form carbonates which settle out from the heated stream during the counter-current contact.

4. The process of claim 1, wherein the heating of the digestate stream is heated to a temperature from 194° F. (90° C.) to 212° F. (100° C.) to form the heated stream.

5. The process of claim 1, wherein the step of contacting the heated stream with air further comprises:
   introducing the heated stream into a desorption zone to form a desorbed stream, wherein within the desorption zone the heated stream undergoes counter-current contact with air, so as to desorb the first portion of the ammonia from the heated stream so as to mix with air to form an air mixture, and wherein a first portion of the bicarbonate reacts with metals in the digestate to form carbonates which settle out from the heated reduced-solids stream during the counter-current contact, and wherein the air mixture is separated from the desorbed digestate and removed from the desorption zone; and
   introducing the desorbed digestate stream from the desorption zone to a retention zone so that the digestate stream is maintained at temperature of at least about 194° F. (90° C.) so as to eliminate bacteria, wherein in the retention zone a second portion of the ammonia is separated from the desorbed digestate, and a second portion of the bicarbonate reacts with the metals to form carbonates which settle out from the desorbed digestate so as to form the treated digestate stream, and wherein the second portion of the ammonia is removed from the desorption zone and combined with the first portion of the air mixture to form the gaseous effluent stream.

6. The process of claim 1, further comprising, prior to the heating of the digestate stream, separating out a portion of the solids, including insoluble salts, from the digestate stream so as to reduce the solids in the digestate stream to the range of from 1.1 to 1.5 wt % solids, and wherein the digestate stream as a pH of from 7 to 8.

7. The process of claim 6, wherein after the contacting the digestate stream with air, the treated digestate has a pH from 8 to 9.5.

8. The process of claim 7, wherein prior to introducing the treated digestate stream to the bioethanol plant, acid is added to the treated digestate stream so as to adjust the pH of the treated digestate stream.

9. The process of claim 1, further comprising producing the digestate stream from thin stillage produced in a bioethanol plant by the steps of:
   introducing the thin stillage to a digesting zone at a temperature in a mesophilic temperature range, wherein within the digesting zone the thin stillage undergoes anaerobic digestion to produce methane and carbon dioxide;
   separating a digestate stream from a gaseous stream containing the methane and the carbon dioxide; and
   introducing the gaseous stream to a desulfurization zone where desulfurization is carried out to remove hydrogen sulfide, wherein the desulfurization produces an acid-water stream having a pH from 1.5 to 3, a biogas stream, and waste stream containing at least one of ammonium sulfide, ammonium hydrosulfide or ammonium bicarbonate; and
   wherein the conditions during producing the digestate stream are suitable to promote the formation of ammonium bicarbonate.

10. The process of claim 9, further comprising:
    contacting the gaseous effluent stream with the acid-water stream from the desulfurization zone to remove ammonia from the gaseous effluent stream and form a water stream containing ammonia, ammonium sulfide and ammonium hydrosulfide and having a pH from 8 to 9.7; and
    introducing the water stream into the desulfurization zone.

11. The process of claim 10, further comprising adjusting the temperature of the thin stillage prior to introduction into the digesting zone to a temperature in the mesophilic temperature range.

12. The process of claim 11, wherein the mesophilic temperature range is in from 68° F. (20° C.) and 113° F. (45° C.).

13. The process of claim 12, wherein the contacting of the heated stream with air is by counter-current contact.

14. The process of claim 13, wherein during contacting of the heated stream with air a portion of the bicarbonate reacts with metals in the digestate to form carbonates which settle out from the heated stream during the counter-current contact.

15. The Process of claim 14, wherein the heating of the digestate stream is heated to a temperature from 194° F. (90° C.) to 212° F. (100° C.) to form the heated stream.

16. The process of claim 15, wherein the heating of the digestate stream is by indirect counter-flow heat exchange with the thin stillage from the bioethanol plant so as to result in at least part of the temperature adjustment to the mesophilic temperature.

17. The process of claim 16, further comprising introducing the waste stream into a reception tank, and subsequently using the waste stream as a biofertilizer.

18. The process of claim 17, further comprising, prior to the heating of the digestate stream, separating out a portion of the solids, including insoluble salts, from the digestate stream so at to reduce the solids in the digestate stream to the range of from 1.1 to 1.5 wt % solids, wherein the digestate stream has a pH from 7 to 8, and wherein the portion of the solids separated out introduced into the reception tank to be combined with the waste stream.

19. The process of claim 18, wherein after the contacting the treated digestate stream with air, the treated digestate has a pH from 8 to 9.5.

20. The process of claim 19, wherein prior to introducing the treated digestate stream to the bioethanol plant, acid is added to the treated digestate stream so as to adjust the pH of the treated digestate stream.

21. A process for treating a thin stillage produced in a bioethanol plant, the process comprising:
    introducing the thin stillage to a digesting zone where the thin stillage from the bioethanol plant has undergone temperature reduction to a mesophilic temperature in the range of 68° F. (20° C.) and 113° F. (45° C.), wherein within the digesting zone the thin stillage undergoes anaerobic digestion to produce methane and carbon dioxide;
    separating a digestate stream from a gaseous stream containing the methane and the carbon dioxide, wherein the digestate stream contains ammonium bicarbonate;
    introducing the gaseous stream to a desulfurization zone where desulfurization is carried out to remove hydrogen sulfide, wherein the desulfurization produces an acid-water stream having a pH from 1.5 to 3, a biogas stream, and waste stream containing at least one of ammonium sulfide, ammonium hydrosulfide or ammonium bicarbonate;
    separating out a portion of the solids, including insoluble salts, from the digestate stream to produce a reduced-solids digestate stream having from 1.1 to 1.5 wt % solids;
    heating the reduced-solids stream to a temperature from 194° F. (90° C.) to 212° F. (100° C.) sufficient to decompose ammonia bicarbonate contained in the digestate stream into ammonium and bicarbonate, wherein the heating is by indirect counter-flow heat exchange with the thin stillage from the bioethanol plant so as to result in at least part of the temperature reduction to the mesophilic temperature;
    subsequently, contacting the thus heated reduced-solids digestate stream with air by counter-current contact, wherein a portion of the bicarbonate reacts with metals in the digestate to form carbonates which settle out from the reduced-solids digestate stream during the counter-current contact, wherein ammonia is desorbed from the heated reduced-solids stream to mix with the air so as to form a gaseous effluent stream and leave a treated digestate stream having lower amounts of ammonium, bicarbonate and metals than the heated reduced-solids digestate stream;
    introducing the treated digestate stream to the bioethanol plant so as to form part of a grain slurry used for production of ethanol;
    contacting the gaseous effluent stream with the acid-water stream from the desulfurization zone to remove ammonia from the gas and form a water stream containing ammonium and having a pH from 8 to 9.7; and
    introducing the water stream into the desulfurization zone.

22. The process of claim 21, further comprising introducing the waste stream and the portion of the solids separated out form the digestate stream into a reception tank, and subsequently using the waste stream and portion of the solids as a biofertilizer.

23. The process of claim 21, wherein prior to introducing the treated digestate stream to the bioethanol plant, acid is added to the treated digestate stream so as to adjust the pH of the treated digestate stream.

* * * * *